United States Patent
Verboomen et al.

(10) Patent No.: US 11,519,868 B2
(45) Date of Patent: Dec. 6, 2022

(54) APPARATUS AND METHOD FOR ANALYSING AND PROCESSING GRANULAR MATERIAL

(71) Applicant: SORTERRA GLOBAL PTY LTD, Brisbane (AU)

(72) Inventors: Jan Verboomen, Warana (AU); Steven Verboomen, Warana (AU)

(73) Assignee: Sorterra Global Pty Ltd, Brisbane (AU)

( * ) Notice: Subject to any disclaimer, the term of this patent is extended or adjusted under 35 U.S.C. 154(b) by 119 days.

(21) Appl. No.: 16/968,046

(22) PCT Filed: Feb. 7, 2019

(86) PCT No.: PCT/AU2019/050087
§ 371 (c)(1),
(2) Date: Aug. 6, 2020

(87) PCT Pub. No.: WO2019/153040
PCT Pub. Date: Aug. 15, 2019

(65) Prior Publication Data
US 2021/0033547 A1    Feb. 4, 2021

(30) Foreign Application Priority Data
Feb. 7, 2018   (AU) .............................. 2018900374

(51) Int. Cl.
*G01N 23/083*    (2018.01)
*G01N 1/10*       (2006.01)
(Continued)

(52) U.S. Cl.
CPC ............ *G01N 23/083* (2013.01); *G01N 1/10* (2013.01); *G01N 1/2035* (2013.01); *G01N 1/286* (2013.01);
(Continued)

(58) Field of Classification Search
None
See application file for complete search history.

(56) References Cited

U.S. PATENT DOCUMENTS

| 3,499,144 | A | 3/1970 | Juillet et al. |
| 4,090,074 | A | 5/1978 | Watt et al. |
| (Continued) | | | |

FOREIGN PATENT DOCUMENTS

| AU | 2010202919 B2 | 9/2011 |
| DE | 3120064 A1 | 12/1982 |
| (Continued) | | |

OTHER PUBLICATIONS

International Search Report and Written Opinion for International Application No. PCT/AU2019/050087, dated Apr. 16, 2019; 10 pages.

*Primary Examiner* — Thomas R Artman
(74) *Attorney, Agent, or Firm* — Mueting Raasch Group (57) ABSTRACT

A method of analysing granular material in a slurry, the method comprising: compacting the granular material in the slurry to form one or more pucks; irradiating said pucks with X-Ray radiation and detecting X-ray energy transmitted through said one or more irradiated pucks; irradiating a reference material with X-Ray radiation, said reference material having known material characteristics and detecting X-ray energy transmitted through said reference material; comparing X-ray energy transmission through said one or more pucks with the reference material to compute, using a processing unit, one or more particle characteristics of the granular material in the one or more pucks.

21 Claims, 7 Drawing Sheets

(51) Int. Cl.
*G01N 1/20* (2006.01)
*G01N 1/28* (2006.01)
*G01N 1/40* (2006.01)

(52) U.S. Cl.
CPC ... *G01N 1/4077* (2013.01); *G01N 2001/1025* (2013.01); *G01N 2001/205* (2013.01); *G01N 2001/2866* (2013.01); *G01N 2223/04* (2013.01); *G01N 2223/1016* (2013.01); *G01N 2223/302* (2013.01); *G01N 2223/3037* (2013.01); *G01N 2223/312* (2013.01); *G01N 2223/3306* (2013.01); *G01N 2223/616* (2013.01); *G01N 2223/617* (2013.01); *G01N 2223/633* (2013.01); *G01N 2223/635* (2013.01); *G01N 2223/64* (2013.01)

(56) References Cited

U.S. PATENT DOCUMENTS

| | | | | |
|---|---|---|---|---|
| 5,065,416 A | * | 11/1991 | Laurila | G01N 23/12 378/53 |
| 5,627,874 A | * | 5/1997 | Smallbone | G01N 23/223 378/208 |
| 8,610,019 B2 | * | 12/2013 | Roos | B07C 5/3416 209/579 |
| 8,853,584 B2 | * | 10/2014 | Roos | B07C 5/3416 378/53 |
| 9,126,236 B2 | * | 9/2015 | Roos | B07C 5/3416 |
| 9,746,431 B2 | * | 8/2017 | Grader | G01N 23/046 |
| 2010/0219109 A1 | * | 9/2010 | Roos | B07C 5/346 209/3.1 |
| 2013/0301794 A1 | * | 11/2013 | Grader | G01N 23/087 378/5 |
| 2014/0069848 A1 | * | 3/2014 | Roos | B07C 5/3416 209/3.1 |
| 2014/0311954 A1 | * | 10/2014 | Roos | B07C 5/3416 209/589 |
| 2021/0033547 A1 | * | 2/2021 | Verboomen | G01N 23/20008 |

FOREIGN PATENT DOCUMENTS

| | | | | |
|---|---|---|---|---|
| GB | 974393 A | 11/1964 | | |
| WO | WO 2007/033415 A1 | 3/2007 | | |
| WO | WO-2007033415 A1 | * | 3/2007 | ............ G01N 9/36 |
| WO | WO-2019153040 A1 | * | 8/2019 | ........... G01N 1/2035 |

* cited by examiner

APPARATUS AND METHOD FOR ANALYSING AND PROCESSING GRANULAR MATERIAL

This application is the § 371 U.S. National Stage of International Application No. PCT/AU2019/050087, filed 7 Feb. 2019, which claims the benefit of Australian Application No. 2018900374, filed 7 Feb. 2018, the disclosures of which are incorporated by reference herein in their entireties.

TECHNICAL FIELD

The present invention relates to an apparatus and method for analysing and processing materials such as but not limited to coal fines and other minerals.

BACKGROUND

Any references to methods, apparatus or documents of the prior art are not to be taken as constituting any evidence or admission that they formed, or form part of the common general knowledge.

Ore and mineral processing operations inevitably produce fine particles that can lead to process losses. Mineral and ore processing operations have undergone considerable development in order to process these fine particles for improving overall product recovery. In order to maximise efficiency, it is important to monitor and analyse the material characteristics of the fines processed during any processing operation. In-line monitoring and analysis of the fines during any processing operation for determining the quality of the fine particles allows for process adjustments in the fine particle processing stages.

Current known slurry analysers such as the analyser described in WO2007/033415 rely on monitoring and controlling a large number of characteristics such as flow rate liquid density and solid density of the slurry of the analyte. The varying ratio of solids to liquid hampers the measurement of densities which change with different ratios solids vs liquids even at constant ash content. Further, slurries contain varying levels of salts interfere with measurement systems using electrical conductivity as a measurement parameter. Such systems have proven to be successful at laboratory level but unsuccessful when operating in conjunction with spirals at wash plants.

In view of the above, it is desirable to provide an improved apparatus and method that addresses some of the shortcomings of the prior art.

SUMMARY OF INVENTION

In one aspect, the invention provides a method of analysing granular material in a slurry, the method comprising:
compacting the granular material in the slurry to form one or more pucks;
irradiating said pucks with X-Ray radiation and detecting X-ray transmission through said one or more irradiated pucks;
irradiating a reference material with X-Ray radiation, said reference material having known material characteristics and detecting X-ray energy transmitted through said reference material;
comparing X ray energy transmission of said one or more pucks with the reference material to compute, using a processing unit, one or more particle characteristics of the granular material in the one or more pucks.

In an embodiment, the step of comparing X ray energy transmission through said one or more pucks with the reference puck is used for computing average density or relative average density of the granular material in the one or more pucks.

In an embodiment, the step of comparing X ray energy fluorescence of said one or more pucks with the reference puck is used for computing average density or relative average density of the granular material in the one or more pucks.

In an embodiment, the step of forming said one or more pucks comprises the steps of directing one or more streams of slurry into a collection chamber, filtering said slurry to separate the granular material from the slurry and compressing the granular material to form one or more of said pucks.

In an embodiment, the method further comprises the step of crushing the separated granular material before said compression to form the one or more of the pucks.

In an embodiment, said one or more pucks and the reference material are irradiated by a common irradiation source.

In an embodiment, a plurality of reference materials are irradiated with X-Ray radiation and wherein the comparing step involves comparing X ray energy transmission through said one or more pucks with the plurality of reference materials.

In an embodiment, the step of detecting X-ray energy transmitted through said one or more irradiated pucks is followed by a step of processing one or more measurement signals corresponding to one or more of said irradiated pucks respectively and wherein the step of detecting X-ray energy transmitted through said reference material is followed by a step of processing one or more measurement signals corresponding to said reference material and whereby the processing unit compares the measurement signals of said one or more pucks with the measurement signal of the reference material to compute particle characteristics of the granular material.

In an embodiment, said one or more pucks and the reference material are positioned in a movable holder assembly such that the one or more pucks and the reference material are irradiated with X-Ray radiation sequentially.

In an embodiment, the method comprises a step of outputting one or more alphanumeric characters or an electrical signal corresponding to the computed particle characteristics of the granular material in the one or more pucks.

In an embodiment, the method further comprises the steps of: irradiating a plurality of reference materials with X-Ray radiation, said reference materials having known density values, and detecting X-ray energy transmitted through said reference materials to compute a function that co-relates the values of X-Ray transmission for each reference material with the density values of the respective reference materials; and irradiating one or more of said pucks with X-Ray radiation and detecting X-ray energy transmitted through the pucks and computing densities of the one or more of said pucks by applying said function to the values of the X-ray energy transmitted through the pucks.

In an embodiment, the method further comprises the steps of graphing values of the X-Ray energy transmitted through said reference materials as a function of the density values to display a graph on a display unit and juxtaposing the values of the X-ray energy transmitted through the pucks on the graph to determine densities of the one or more of said pucks.

In a further embodiment, the method further comprises the step of irradiating at least one of said pucks with X-Ray radiation at a plurality of orientations and detecting X-ray energy transmitted through the puck for each corresponding orientation to compute density of a portion of the puck irradiated by the X-Ray radiation to determine particle density fraction of the puck.

In another aspect, the invention also provides a method of processing granular material comprising: an initial step of directing a stream of slurry for analysis in accordance with the method as described above to compute one or more particle characteristics of the granular material in the one or more pucks; and adjusting at least one processing parameter for the slurry in response to one or more pre-determined rules associated with the computed particle characteristics.

In another aspect, the invention provides an apparatus for analysing granular material in a slurry, the apparatus comprising:
- a collection chamber for receiving one or more slurry streams;
- a filtering assembly for filtering said one or more slurry streams to separate granular material from the slurry stream;
- one or more pressing members for compressing the granular material to form one or more pucks;
- radiation source for irradiating said pucks with X-Ray radiation;
- one or more detectors for detecting X-ray energy transmitted through said one or more irradiated pucks; and
- a processing unit for processing measurement signals corresponding to X-ray energy transmitted through said one or more pucks by comparing said signals to measurement signals corresponding to X-ray energy transmitted through a reference material and thereby computing one or more particle characteristics of the granular material in the one or more pucks.

In an embodiment, the apparatus further comprises a holder for holding one or more of said pucks and a positioning arrangement for movably positioning one or more of said holders relative to the radiation source and/or one or more detectors.

In an embodiment, the holder is positioned transversely relative to the direction of radiation and whereby the positioning arrangement is adapted to sequentially position at least one of said pucks in the path of radiation emitted by the radiation source.

In an embodiment, the detector is movably positioned relative to the holder and/or the radiation source.

In an embodiment, the apparatus further comprises one or more valves for controlling flow of slurry into the collection chamber.

In an embodiment, the apparatus further comprises a control arrangement for separating the feed slurry flowing into a spiral separator and an adjustment unit for adjusting at least one slurry feed parameter in response to measurement signals associated with the corresponding to X-ray energy fluoresced by said one or more pucks.

In an embodiment, the one or more pucks are substantially cylindrical and wherein the sample holder is moveable to position said pucks at a plurality of orientations during irradiation by the radiation source to allow irradiation and detection of the sample at said plurality of orientations.

In a further embodiment, the one or more pucks are substantially cylindrical and wherein the sample holder is rotatable about an axis to rotate said pucks during irradiation by the radiation source to allow irradiation and detection of the sample at a plurality of orientations.

In a further embodiment, by comparing X-ray transmission values of said cylindrical pucks and said one or more cylindrical reference materials by use of time of one exact full revolution of said pucks and reference materials, a fractional comparison can be determined by comparing each individual value measured without the need for imaging software. The accuracy of this embodiment is heavily depended on the detector pixel pitch and size of the puck.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
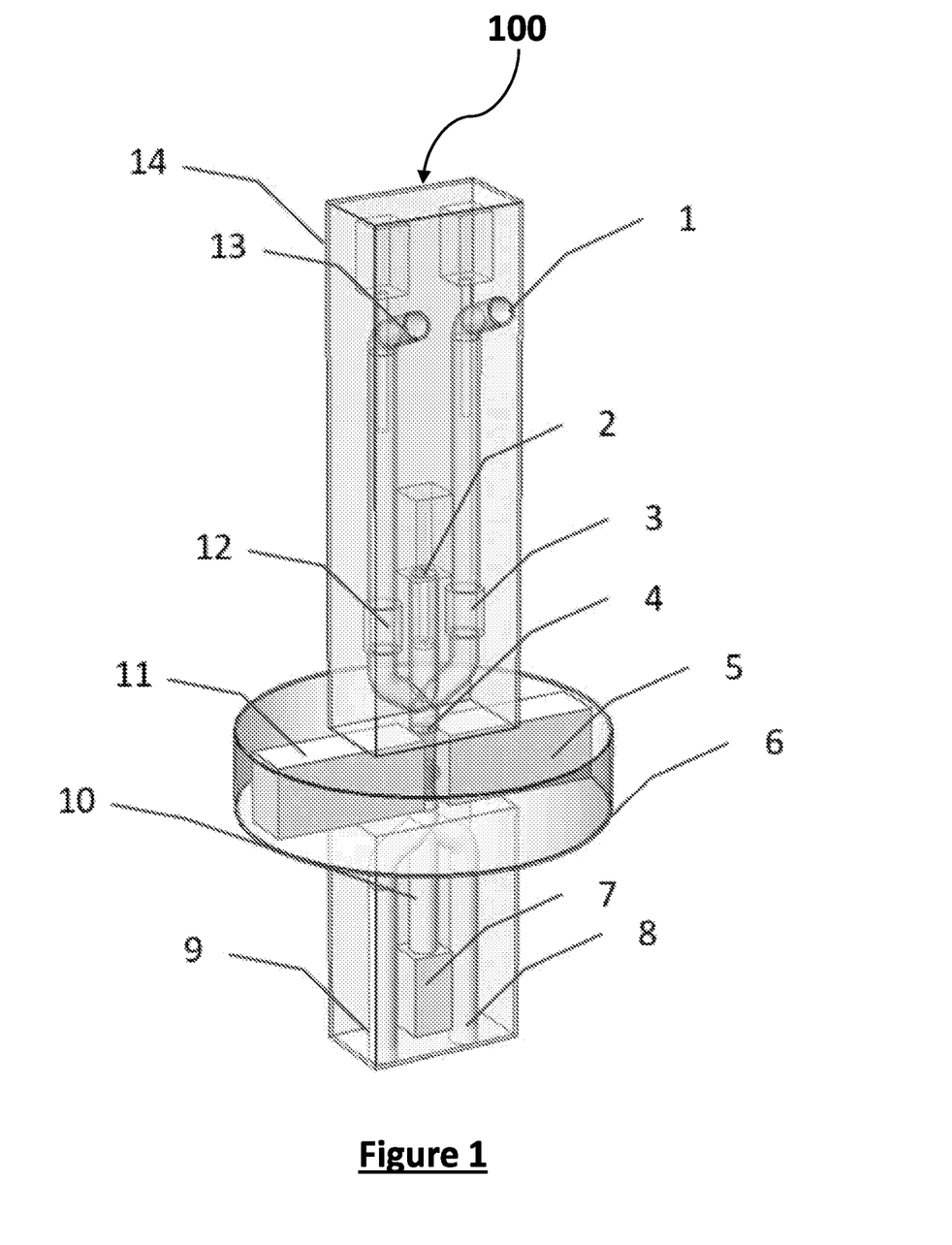
FIG. 1 is a perspective view of an apparatus 100 for analysing and processing granular material.

Referring to FIG. 1, an apparatus 100 for analysing and processing granular material such as coal fines and mineral fines is illustrated. The presently described embodiment illustrates a gravity fed mineral analyser which may be coupled to a spiral separator (not shown). Generally, a spiral separator comprises a helical or spiral trough mounted about an upright column. During operation of a spiral separator of this kind, slurry, containing mineral particles to be separated (or concentrated) is fed to the top of the helical trough. As the slurry descends in the trough under gravity, the mineral bearing particles in the slurry migrate radially outwardly under centrifugal forces according to size, density or specific gravity. Smaller or less dense coal particles move under the action of centrifugal forces in a radially outward direction to form a stream rich with coal particles while denser waste particles migrate radially inward towards the central column to form a waste stream. The slurry stream may be received into a first inlet (1) controlled by a valve (3). The slurry stream may also undergo a filtration process to separate any granular particles from the liquid component of the slurry stream. The separated granular material may subsequently be crushed, compressed or compacted using controlled pressure using a sample compressing actuator (2) which may compress the separated granular material into any desired shape. In the preferred embodiment, the separated granular material is compressed to form a solid puck of pre-determined dimensions. The waste stream may be directed into a second inlet (13) and controlled by a valve (12). Each of the first and second inlets (1) and (13) feed into a collection chamber (4) which may be used as a measuring enclosure (usually made from carbon aramid fibre composite or borosilicate tube). The valves (3) and (12) may be used alternatively to control the streams feeding into the collection chamber (4). An actuator (7) coupled with a timer may also be utilised for timing the drainage and for triggering sample collection in the sample collection chamber (4). Concentrate from the slurry sample stream may be recycled back into the spiral separator flow via the first recycling outlet after analysis (8). Similarly, any waste from the waste stream which hasn't been utilised for sampling may be recycled back to the spiral separator using a second recycling outlet (9). Each of the first and second inlet and the conduits coupled to these inlets may be housed in a housing 14.

Once the granular material from either of streams (waste or concentrate) is filtered and compressed into one or more pucks the said pucks may be irradiated using X-Ray radiation from a self-contained X-Ray source (5) housed in an enclosure (6) to prevent any radiation leakage. The use of the apparatus 100 involves positioning one or more of the pucks such that these pucks are irradiated by X-Ray radiation from the source. X-ray energy transmitted through the irradiated pucks may be detected by an X-Ray detector (11). The X-ray energy transmitted through these one or more pucks (the subject of analysis) is then compared with the X-ray energy transmitted through a reference puck having known material characteristics. In the presently described embodiment, the reference puck is in the form of a calibration tracer having a known density (such as 1.3 g/cm$^3$). During the course of the operation of the apparatus 100, the same X-Ray source (for example, but not limited to, 100 kV at 100 µA) is used for irradiation of the one or more of the sample pucks (formed from the filtered granular material received from the concentrate stream or the waste stream) and the reference puck.

The enclosure for holding the sample pucks or the one or more reference pucks may be made of carbon fibre and aramid composite, which is highly wear resistant and strong but has a low density that won't significantly impact results in this mineral processing application. Other low-density materials could be for example laminated glass, borosilicate glass or polyurethane.

X-rays which enter any sample are scattered by electrons around the nucleus of atoms in the sample. The scattering usually occurs in various different directions other than the direction of the incident X-rays, even if photoelectric absorption does not occur. As a result, the reduction in intensity of X-rays which penetrate the substance is necessarily detected.

When X-rays with intensity $I_0$ penetrate a uniform substance, the intensity I after transmission through distance x is given by the following equation.

$$I=I_0 e^{-\mu x}$$

Here, the proportional factor µ is called linear absorption coefficient, which is dependent on the wavelength of X-rays and density of the granular material and its unit is usually inverse of distance. However, since the linear absorption coefficient is proportional to density of the compressed granular material. As a result, comparison of the detector energy absorption of the one or sample pucks with detector energy absorption of a reference puck (with a known density) gives a useful indication of the relative density of the granular material in the sample pucks.

The one or more sample pucks and the reference puck absorb many of the X-ray photons, a process called attenuation. The attenuation varies with the physical properties of each of the material comprising each of the sample pucks. For example, a sample with lower density attenuates less in comparison with a sample with higher density. The X-ray detector provides a reading that is representative of the attenuation characteristics of each sample. The interpretation of the results on the X-Ray detector relies upon how attenuation relates to material properties.

Figure 2:
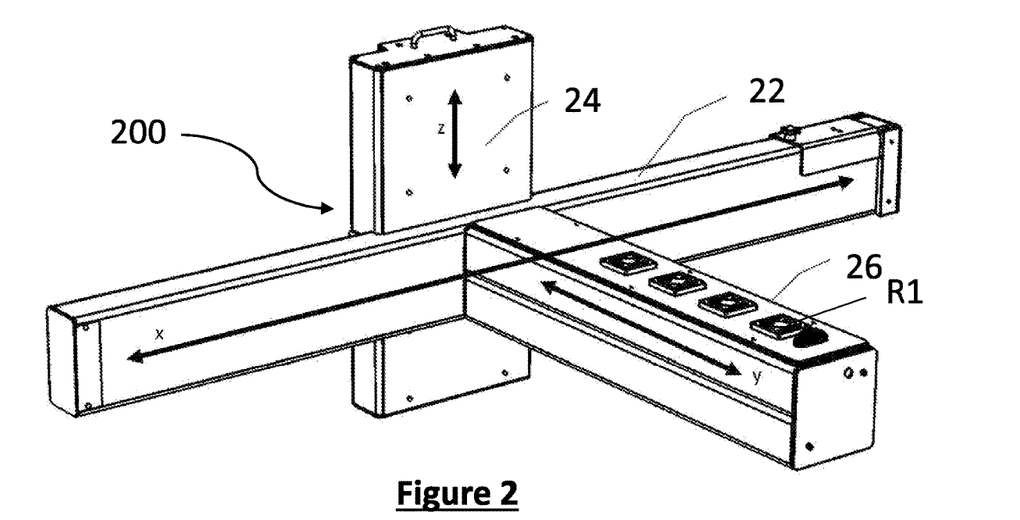
FIG. 2 is a perspective view of a sample arrangement 200 comprising an X-Ray detector enclosure (24), a sample enclosure (26) and an X-ray source enclosure (22).
Figure 3:
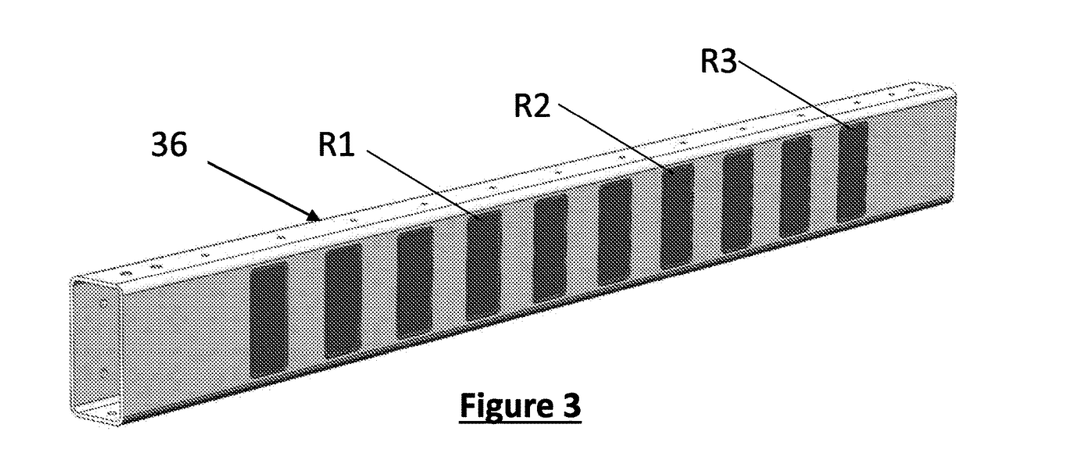
FIG. 3 is another embodiment of a sample enclosure 36.

Referring to FIGS. 2 and 3 a sample arrangement 200 is illustrated. The arrangement 200 comprises an X-Ray detector enclose (24), a sample enclosure (26) and an X-ray source enclosure (22). Each of the X-Ray detector enclose (24), a sample enclosure (26) and an X-ray source enclosure (22) may be movable in mutually perpendicular directions (along X, Y and Z axis respectively). The aforementioned arrangement 200 allows sequential movement of the holders the holders to carry out sampling any one of the sample pucks of the reference pucks (such as R1, R2 and R3). Sample holder 36 is another embodiment and illustrates a holder that allows 7 sample pucks and 3 reference pucks to be positioned in a linear arrangement for sampling using the X-ray source (5).

In some embodiments, the sample enclosure may be formed from wear resistant material such as carbon fibre and aramid composite.

The sample pucks and the reference pucks may be substantially identical in volume and geometry. By way of example, the samples may be in the form of solid cubes or cylinders or any other required shape. If samples are minerals they will generally be compressed by a form of actuation, alternatively samples could be pressurised into a shape. By way example, coal cubes with a sample depth of 50 mm may be used. sample depth or 50 mm coal tracers are a suitable thickness for measuring contrast; 100 kV at 100 µA is sufficient to detect contrast in coal fines and determine its ash content. Other applications may require different sized pucks to measure contrast. Sample may be 'ideal coal sample' that has been tested and recycled in the form of a calibration puck. A thicker sample will require more energy, but this allows for better accuracy and less error.

The reference pucks may be provided in the form of density tracers which typically have known densities and are usually used in the mining industry for performance testing of material processing. Density Tracers usually contain particles having precise densities to mimic the densities of particles in a plant feed stream: Other materials with known densities may also be used as reference pucks.

The shape of the x-ray beam can be varied to suit application. For example, a micro-focus x-ray source can be transmissive and deliver a certain pattern of x-ray. The design of the X-ray equipment may offer various emitting patterns. Lenses such as a Kumakhov lens may be used to direct X-ray energy substantially parallel as opposed to emitting outward in a cone like shape.

It is also important to note that the same X-ray source is used for irradiating the sample pucks and the reference pucks. As a result, there is no need for calibrating the source or detector as this is continuously done through every sample. Increasing error margins may indicate a need for repair or replacement. An automated quality control module for detecting any operability issues with the source and detector may also be provided in conjunction with the processing unit (37).

Figure 4:
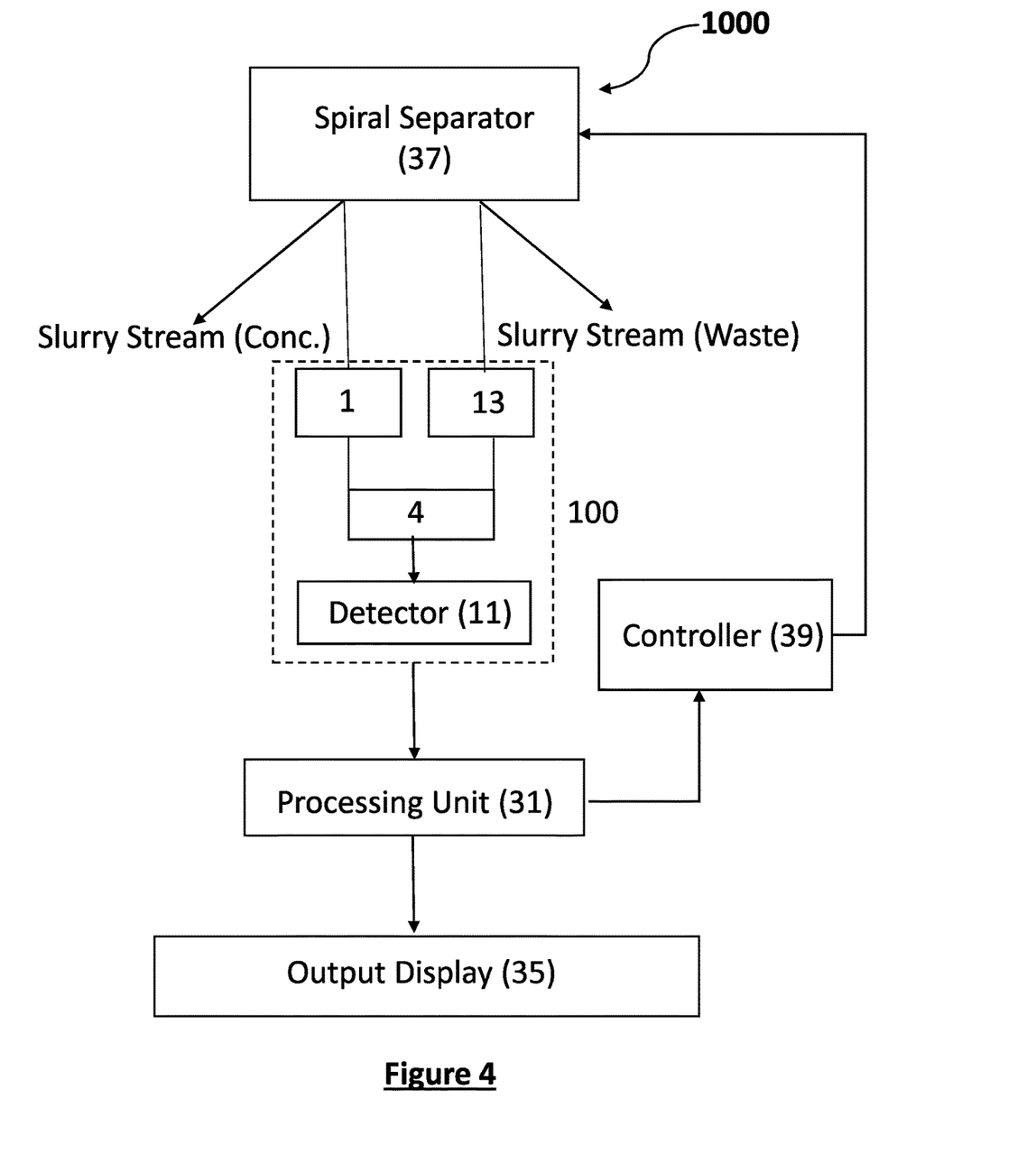
FIG. 4 is a block diagram of a system 1000 comprising a spiral separator (37) operatively coupled with the apparatus 100 in communication with a processing unit (31) and a controller (39) for controlling/adjusting process parameters of the spiral separator (37).

Referring to FIG. 4, the box diagram depicts the operation of the apparatus 100 in combination with a spiral separator (37). A processing unit (37) is provided to carry out a comparison of the X-ray energy transmission through said one or more sample pucks with the one or more reference pucks to compute particle characteristics such as quality or relative density of the granular particles in the sample puck. It is important to note that the presently described method and apparatus allows the granular material to be classified on a comparative basis by comparing the X-Ray transmission through the sample pucks with the reference pucks. As a result, in at least some embodiments, the actual density values for the sample pucks are calculated and the comparison of the detector energy absorbance levels between one or more of the sample pucks and the reference pucks (which have known/pre-determined characteristics) assists in verifying that the calculated values is substantially accurate. The presently described method can provide useful information about the particle characteristics (such as mineral content or density) in the sample pucks.

The processing unit (37) may be provided in the form of a computing device having a processor in communication with a memory device. The processor may be arranged to process one or more measurement signals from the detector corresponding to X-ray energy transmitted through the sample pucks and the reference pucks in accordance with executable instructions saved on the memory device to compute particle characteristics (such as relative density) of the granular material in the sample pucks. The processing unit (37) may also be arranged to be in communication with a controller (39) for adjusting the processing parameters of the spiral separator (37) to improve yields in the concentrated slurry stream and reduce product wastage in the waste stream of the spiral separator (37). In at least some embodiments, the memory device of the processing unit (37) may be pre-programmed to automatically vary the processing parameters by communicating with the controlling unit (39) thereby eliminating the need for constant monitoring of the measurement signals of the X-Ray detector and manually controlling the spiral separator.

It is important to note that the apparatus 100 and the sampling arrangement 200 may be utilised in a laboratory or any other environment without being directly coupled with a processing facility.

Figure 5:
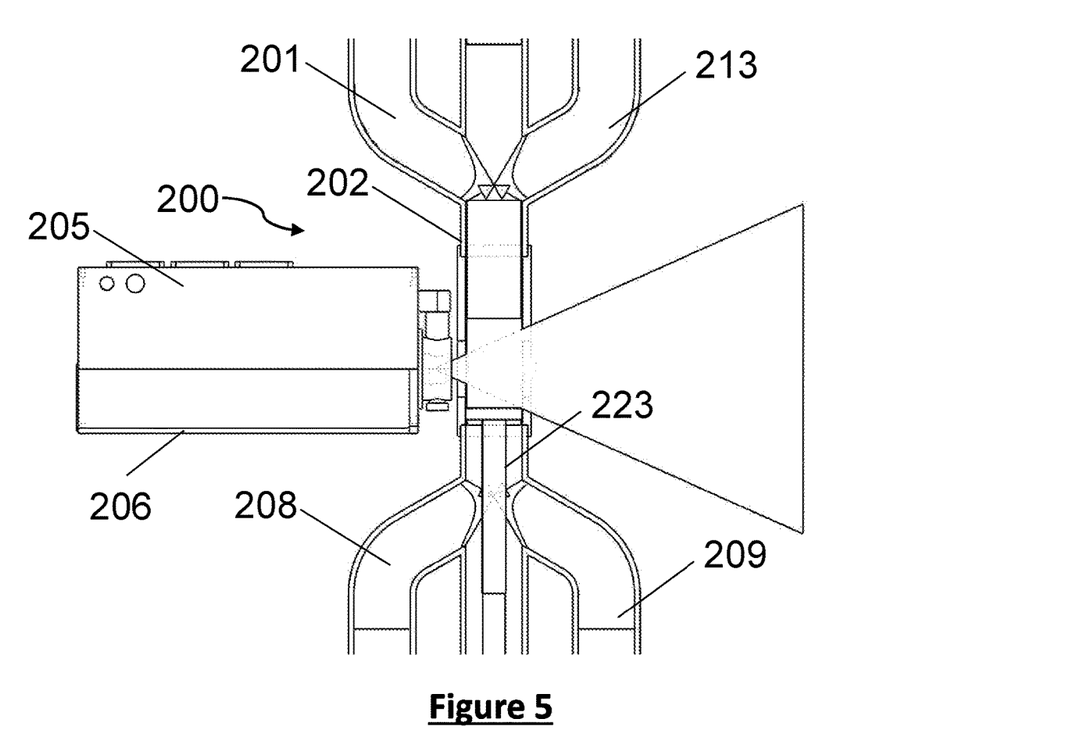
FIG. 5 is a sectional view of an apparatus 200 for analysing and processing granular material in accordance with a second embodiment.
Figure 6:
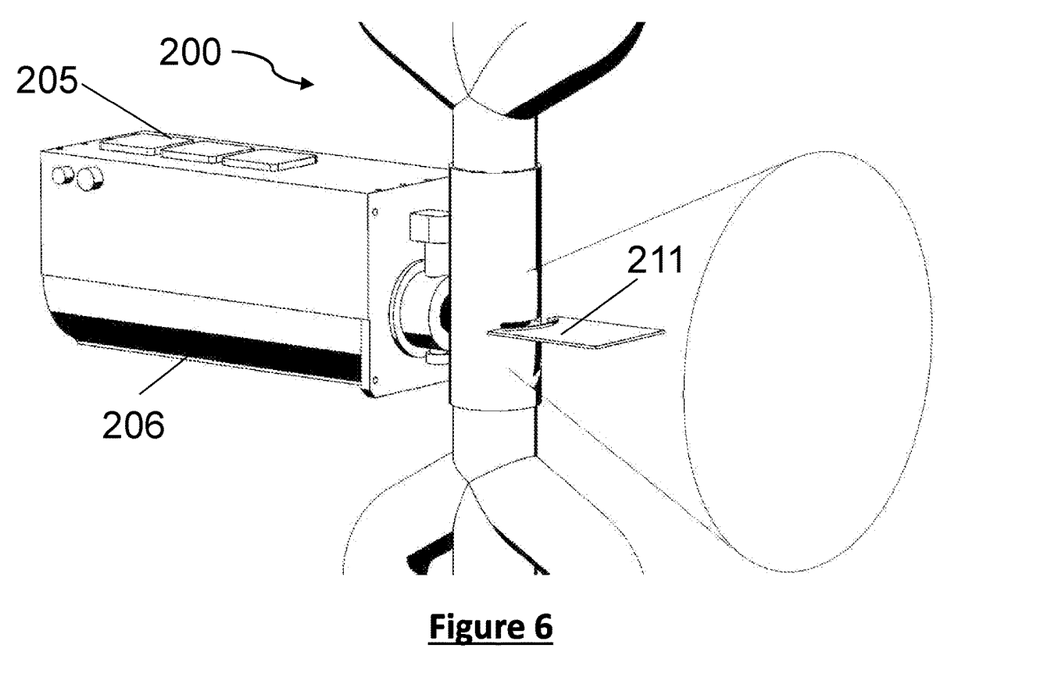
FIG. 6 is a perspective view of the apparatus 200 in accordance with the second embodiment.
Figure 7:
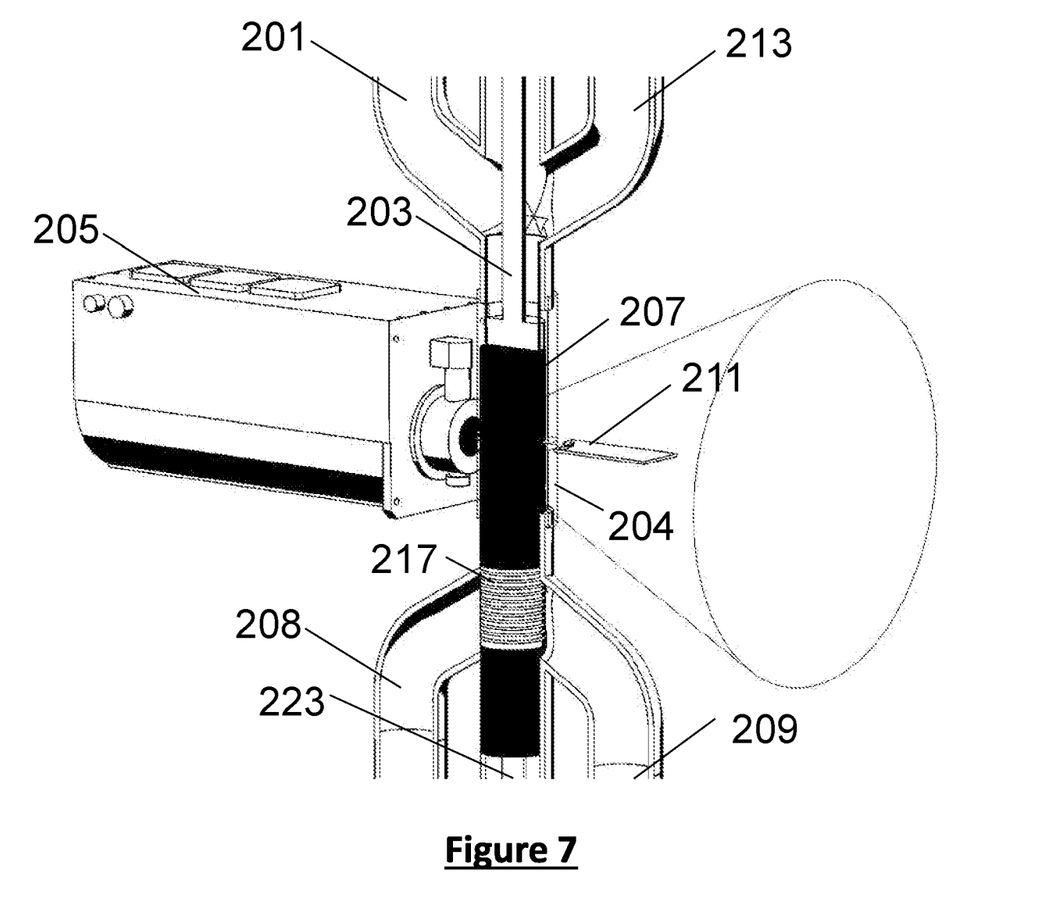
FIG. 7 is a sectional perspective view of the apparatus 200 in accordance with the second embodiment.

Referring to FIGS. 5 to 7, a second embodiment of an apparatus 200 for analysing and processing granular material such as coal fines and mineral fines is illustrated. The apparatus 200 also provides a gravity fed mineral analyser which may be coupled to a spiral separator (not shown) in a manner as described in the previous sections. The spiral separator comprises a helical or spiral trough mounted about an upright column and during operation of the spiral separator, slurry, containing mineral particles to be separated (or concentrated) is fed to the top of the helical trough and as the slurry descends in the trough under gravity, the mineral bearing particles in the slurry migrate radially outwardly under centrifugal forces according to size, density or specific gravity. Smaller or less dense coal particles move under the action of centrifugal forces in a radially outward direction to form a stream rich with coal particles while denser waste particles migrate radially inward towards the central column to form a waste stream.

The slurry stream may be received into a first inlet (201) of the apparatus 200 and may be controlled by a valve (not shown) to direct the slurry stream into a sample receiving chamber (202). The slurry stream flowing through the first inlet (201) may also undergo a filtration process to separate any granular particles from the liquid component of the slurry stream. The separated granular material is subsequently crushed, compressed or compacted using controlled pressure using a sample compressing actuator (203) (shown in FIG. 7) which compresses the separated granular material to form a solid puck from the granular material 207 (which may be of any pre-determined dimension).

The waste stream from the spiral separator is directed into a second inlet (213) and can also be controlled by a valve. Each of the first and second inlets (201) and (213) feed into the sample collection chamber (202) which may be used as a measuring enclosure (usually made from carbon aramid fibre composite or borosilicate tube). Valves may be used alternatively to control the streams feeding into the collection chamber (202). The actuator (7), as described in previous sections may be coupled with a timer may also be utilised for timing the drainage and for triggering sample collection in the sample collection chamber (202). Concentrate from the slurry sample stream may be recycled back into the spiral separator flow via the first recycling outlet after analysis. Similarly, any waste from the waste sample stream may be recycled back to the spiral separator using a second recycling outlet (209).

Once the granular material from either of streams (waste or concentrate) is filtered and compressed into one or more pucks the said pucks may be irradiated using X-Ray radiation from a self-contained X-Ray source (205) housed in an enclosure (206) to prevent any radiation leakage. The compressed granular material (207) is positioned in a radiation resistant sample holder (204) and the use of the apparatus (200) involves irradiating the compressed puck with X-Ray radiation from the source (205). The sample holding enclosure (204) is positioned on a rotating rod (223) which allows axial and rotational movement of the sample holding enclosure (204). Rotation of the sample holding enclosure provides a smaller error margin as more material is analysed or more data can be extracted through the nature of exposure in various positions, though in some cases a fixed enclosure may be suitable.

The use of the apparatus (200) involves positioning the compressed puck in the sample holder (204) so that the puck is irradiated by X-Ray radiation from the source (205). X-ray energy fluoresced from the irradiated puck is detected by a circumferential X-Ray detector (211). The rotation of the rotating rod (223) allows various slices of the compressed puck in the sample holding enclosure (204) to be irradiated by the X-Ray source (205). The provision of the circumferential detector (211) with detectors positioned at various circumferential locations to allow the sample puck to be irradiated and detected at various angles. Once the various slices have been detected by the circumferential detector (211), the data acquired by the detector (211) may be processed to determine fractional density related data of the mineral particles in the same holding enclosure (204). The provision of the rotating rod (223) is useful in providing a much more reliable result for determining density of the compressed puck in the sample holding enclosure (204). A number of reference pucks denoted by (217) may be positioned along the rotating rod (223) below the sample holding enclosure (204). The apparatus (200) may be used by moving the rotating rod (223) in an upward or downward direction to irradiate either a sample of granular material positioned in the sample holding chamber (204) or for irradiating one or more of the reference pucks (217).

As explained in the earlier sections, the apparatus (200) allows users to determine density of granular coal samples obtained from a slurry stream by comparing the X-Ray energy one or more pucks (the subject of analysis) with the X-ray energy fluoresced by one or more reference pucks having known material characteristics (namely density).

Figure 8:
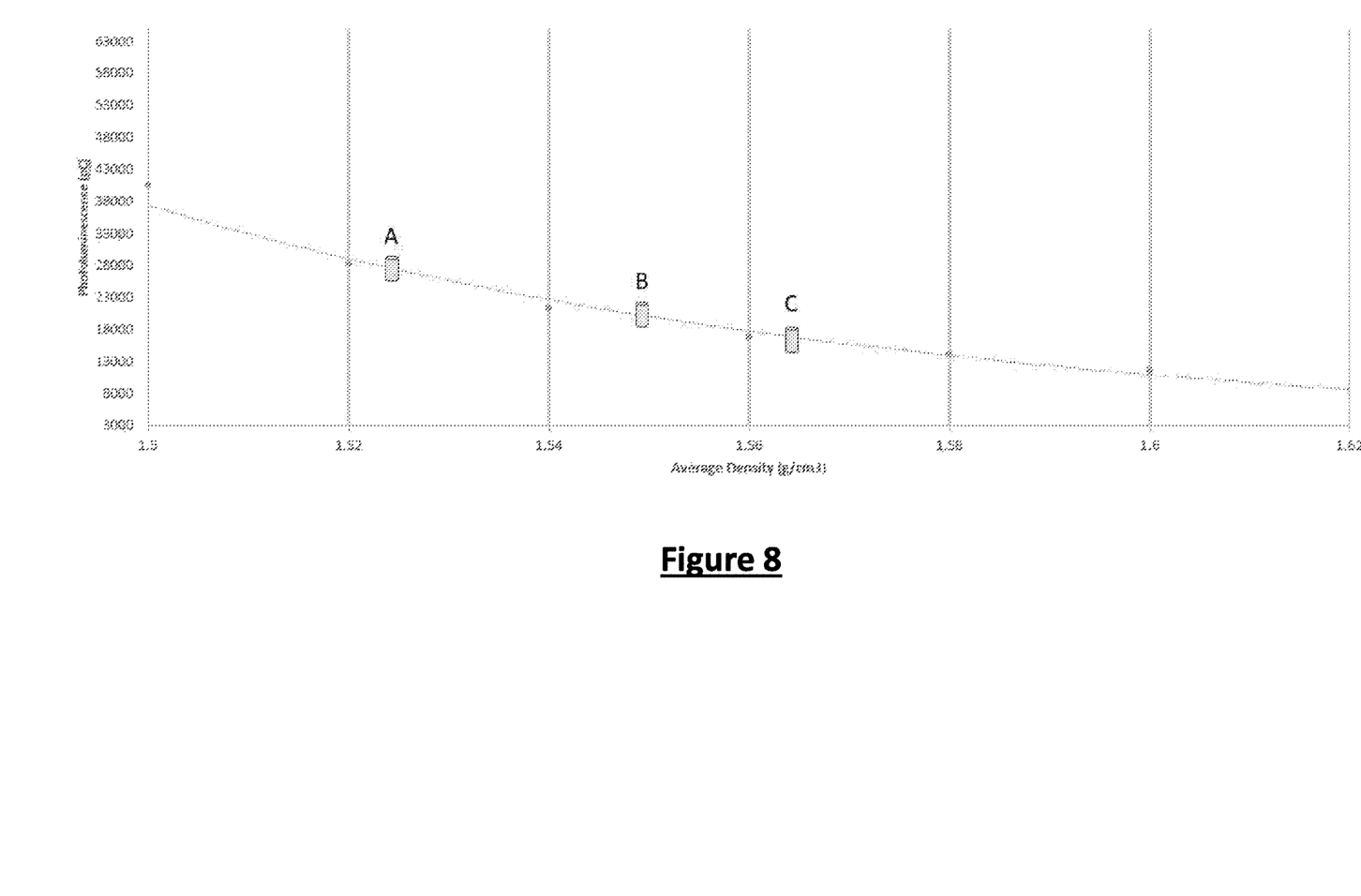
FIG. 8 provides a comparative graph for energy absorbance between an exemplary sample pucks A, B, C and D and four reference materials (tracers 1 to 7).

In the presently described embodiment, the reference pucks are in the form of a number of calibration tracers having known densities (such as 1.5 to 1.62 g/cm³). Referring to FIG. 8, the photoluminescence from each calibration tracer is graphed relative to the density values of the calibration tracers. In some embodiments, once a plurality of the calibration tracers have been irradiated and the photoluminescence has been recorded, a continuous curve may be fitted to the various data points, each data point denoting a point (X, Y) whereby the X co-ordinate denotes the known density of the calibration tracer and the Y-co-ordinate denoting the photoluminescence recorded for each calibration tracer. In some embodiments, the recorded Y values (photoluminescence) for each of the calibration tracers having known densities (denoted by X values) may be used for determining density values (X) as a function F of Photoluminescence (Y).

Once the calibration tracers have been irradiated using the same X-Ray source (205), the next step involves irradiating sample pucks A, B and C (formed from the filtered granular material received from the slurry stream or the waste stream after compression). Determining the density values for each of the samples A, B and C requires applying the values of photoluminescence to the Function F (calculated or graphed during the step of irradiating the calibration tracers) to calculate the density values for each of the samples A, B and C as shown in FIG. 8. By way of example density of sample A (denoted by $X_A$)=$F(Y_A)$; density of sample B (denoted by $X_B$)=$F(Y_B)$; and density of sample C (denoted by $X_C$)=$F(Y_C)$.

In some embodiments, an error factor (±E) for the samples A, B and C may need to be taken into account. In such instances, the density $X_n$ (for any given sample say n) may be related to the photoluminescence of the sample (denoted by $Y_n$) by the following relationship.

$$X_n = F(Y_n) \pm E$$

EXAMPLE

A 32 pixel linear detector may be used for X-ray analysis of a sample pucks and carry out a comparison with four reference pucks provided in the form of density tracers having the following densities:

Tracer 1=1.6 g/cm³; Tracer 2=1.50 g/cm³; Tracer 3=1.40 g/cm³; Tracer 4=1.3 g/cm³

| | | Detector Energy Absorption eV | | | |
|---|---|---|---|---|---|
| Pixel | Sample | Tracer 1.30 g/cm3 | Tracer 1.40 g/cm3 | Tracer 1.50 g/cm3 | Tracer 1.60 g/cm3 |
| 1 | 100022 | 110000 | 100000 | 90000 | 80000 |
| 2 | 105137 | 110333 | 100333 | 90333 | 80333 |
| 3 | 100666 | 110666 | 100666 | 90666 | 80666 |
| 4 | 99150 | 111000 | 101000 | 91000 | 81000 |
| 5 | 99633 | 111333 | 101333 | 91333 | 81333 |
| 6 | 99166 | 111666 | 101666 | 91666 | 81666 |
| 7 | 102055 | 112000 | 102000 | 92000 | 82000 |
| 8 | 107177 | 112333 | 102333 | 92333 | 82333 |
| 9 | 98316 | 112666 | 102666 | 92666 | 82666 |
| 10 | 103000 | 113000 | 103000 | 93000 | 83000 |
| 11 | 103505 | 113500 | 103500 | 93500 | 83500 |
| 12 | 93568 | 114000 | 104000 | 94000 | 84000 |
| 13 | 101383 | 114333 | 104333 | 94333 | 84333 |
| 14 | 104666 | 114666 | 104666 | 94666 | 84666 |
| 15 | 104211 | 114800 | 104800 | 94800 | 84800 |
| 16 | 104323 | 115000 | 105000 | 95000 | 85000 |
| 17 | 103094 | 115000 | 105000 | 95000 | 85000 |
| 18 | 102777 | 114800 | 104800 | 94800 | 84800 |
| 19 | 104666 | 114666 | 104666 | 94666 | 84666 |
| 20 | 102035 | 114333 | 104333 | 94333 | 84333 |
| 21 | 101502 | 114000 | 104000 | 94000 | 84000 |
| 22 | 102005 | 113500 | 103500 | 93500 | 83500 |
| 23 | 101600 | 113000 | 103000 | 93000 | 83000 |
| 24 | 100106 | 112666 | 102666 | 92666 | 82666 |
| 25 | 99313 | 112333 | 102333 | 92333 | 82333 |
| 26 | 102001 | 112000 | 102000 | 92000 | 82000 |
| 27 | 106166 | 111666 | 101666 | 91666 | 81666 |
| 28 | 101028 | 111333 | 101333 | 91333 | 81333 |
| 29 | 100345 | 111000 | 101000 | 91000 | 81000 |
| 30 | 96716 | 110666 | 100666 | 90666 | 80666 |
| 31 | 100333 | 110333 | 100333 | 90333 | 80333 |
| 32 | 99850 | 110000 | 100000 | 90000 | 80000 |
| Sum | 3249515 | 3602592 | 3282592 | 2962592 | 2642592 |
| Average | 102547 | 112581 | 102581 | 92581 | 82581 |

Figure 4A:
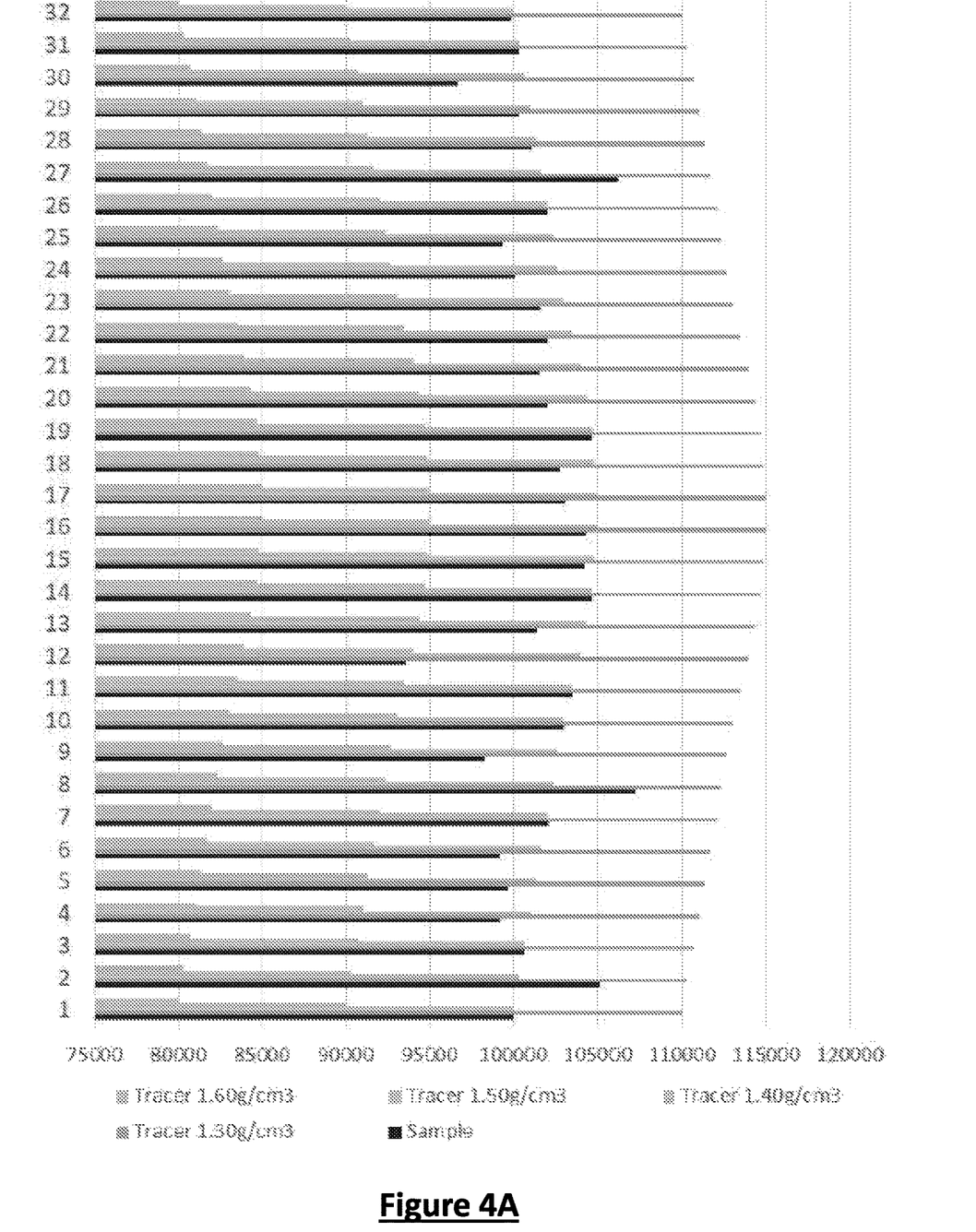
FIG. 4A is a comparative graph for energy absorbance between an exemplary sample puck and four reference materials (tracers 1 to 4).

The table shown above provides values for detector energy absorbance when a 32 pixel linear detector is used for carrying out the comparative analysis of a sample with tracers 1 to 4. FIG. 4A provides a comparative graph indicating detector energy absorbance.

USE OF THE INVENTION

The following is an overview of some of the expected benefits of at least some embodiments of the present invention. By way of example, the present invention may be beneficial for processing of coal by improving yield in coal slurries. Coal mines are typically processing materials in large quantities (bulk). Therefore, it is important that any equipment that is used for optimising performance can meet the processing capacity requirements of each mine. In at least embodiments, the sample measurement may be carried out every 5 or 10 minutes to calculate a trend which gives a reliable indication to signal the spiral separator for optimizing ash removal. The present invention may also be useful for demonstrating processing capacities for various levels of ash contamination. Thermal coal is sold to an energy specification; therefore, it is important that coal processing plants efficiently reduce the ash content to the required percentage with minimal misplacement of good quality coal. The present invention addresses a need for demonstrating yield and efficiency on a wide range of coal types. The combination of processing capacity, yield and efficiency determines the amount of saleable coal and its quality after processing. In combination with these factors, the cost at which the processing takes place will determine the margin increase that can be realised for the processed coal.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A method of analysing granular material in a slurry, the method comprising:
   compacting the granular material in the slurry to form one or more pucks;
   irradiating a section of said pucks with X-Ray radiation and detecting X-ray energy transmission through said one or more irradiated pucks;
   irradiating a section of reference material with X-Ray radiation, said reference material having known material characteristics and detecting X-ray energy transmitted through said reference material; and
   comparing X ray energy transmission through said one or more pucks with the reference material to compute, using a processing unit, one or more particle characteristics of the granular material in the one or more pucks.

2. A method of analysing granular material in the slurry in accordance with claim 1 wherein the step of comparing X ray energy transmission through said one or more pucks with the reference puck is used for computing average density or relative average density of the granular material in the one or more pucks.

3. A method of analysing granular material in the slurry in accordance with claim 1 wherein the step of forming said one or more pucks comprises the steps of directing one or more streams of slurry into a collection chamber, filtering said slurry to separate the granular material from a separated granular material and compressing the slurry to form one or more of said pucks.

4. A method of analysing granular material in the slurry in accordance with claim 3 further comprising the step of crushing the separated granular material before said compression to form the one or more of the pucks.

5. A method of analysing granular material in the slurry in accordance with claim 1 wherein said one or more pucks and the reference material are irradiated by a common irradiation source.

6. A method of analysing granular material in the slurry in accordance with claim 1 wherein a plurality of reference materials are irradiated with X-Ray radiation and wherein the comparing step involves comparing X ray energy transmission through said one or more pucks with the plurality of reference materials.

7. A method of analysing granular material in accordance with claim 1 further comprising the steps of: irradiating a plurality of reference materials with X-Ray radiation, said reference materials having known density values, and detecting X-ray energy transmitted through said reference materials to compute a function (F) that co-relates the values of X-Ray transmission for each reference material with the density values of the respective reference materials; and irradiating one or more of said pucks with X-Ray radiation and detecting X-ray energy transmitted through the pucks and computing densities of the one or more of said pucks by applying said function (F) to the values of the X-ray energy transmitted through the pucks.

8. A method in accordance with claim 7 further comprising the steps of graphing values of the X-Ray energy transmitted through said reference materials as a function of the density values to display a graph on a display unit and juxtaposing the values of the X-ray energy transmitted through the pucks on the graph to determine densities of the one or more of said pucks.

9. A method in accordance with claim 1 further comprising the step of irradiating at least one of said pucks with X-Ray radiation at a plurality of orientations and detecting X-ray energy transmitted through the puck for each corresponding orientation to compute density of a portion of the puck irradiated by the X-Ray radiation to determine particle density fraction of the puck.

10. A method of analysing granular material in the slurry in accordance with claim 1 wherein the step of detecting X-ray energy transmitted through said one or more irradiated pucks is followed by a step of processing one or more measurement signals corresponding to one or more of said irradiated pucks respectively and wherein the step of detecting X-ray energy transmitted through said reference material is followed by a step of processing one or more measurement signals corresponding to said reference material and whereby the processing unit compares the measurement signals of said one or more pucks with the measurement signal of the reference material to compute particle characteristics of the granular material.

11. A method of analysing granular material in accordance with claim 1 wherein said one or more pucks and the reference material are positioned in a movable holder assembly such that the one or more pucks and the reference material are irradiated with X-Ray radiation sequentially.

12. A method of analysing granular material in accordance with claim 1 further comprising a step of outputting one or more alphanumeric characters or an electrical signal corresponding to the computed particle characteristics of the granular material in the one or more pucks.

13. A method of processing granular material comprising: an initial step of directing a stream of slurry for analysis in accordance with the method of claim 1 to compute one or more particle characteristics of the granular material in the one or more pucks; and adjusting at least one processing parameter for the slurry in response to one or more predetermined rules associated with the computed particle characteristics.

14. Apparatus for analysing granular material in a slurry, the apparatus comprising:
   a collection chamber for receiving one or more slurry streams;
   a filtering assembly for filtering said one or more slurry streams to separate granular material from the slurry stream;
   one or more pressing members for compressing the granular material to form one or more pucks;
   radiation source for irradiating said pucks with X-Ray radiation;
   one or more detectors for detecting X-ray energy transmitted through said one or more irradiated pucks; and
   a processing unit for processing measurement signals corresponding to X-ray energy transmitted through said one or more pucks by comparing said signals to measurement signals corresponding to X-ray energy transmitted through a reference material and thereby computing one or more particle characteristics of the granular material in the one or more pucks.

15. Apparatus in accordance with claim 14 further comprising a holder for holding one or more of said pucks and a positioning arrangement for movably positioning one or more of said holders relative to the radiation source and/or one or more detectors.

16. Apparatus in accordance with claim 15 wherein the holder is positioned transversely relative to the direction of radiation and whereby the positioning arrangement is adapted to sequentially position at least one of said pucks in the path of radiation emitted by the radiation source.

17. Apparatus in accordance with claim 14 wherein the detector is movably positioned relative to the holder and/or the radiation source.

18. Apparatus in accordance with claim 14 further comprising one or more valves for controlling flow of slurry into the collection chamber.

19. Apparatus in accordance with claim 14 further comprising a control arrangement for separating the slurry flowing through a spiral separator by use of an adjustment unit for adjusting separation parameters in response to measurement signals associated with the corresponding X-ray energy transmitted through said one or more pucks.

20. Apparatus in accordance with claim 14 wherein the one or more pucks are substantially cylindrical and wherein the sample holder is moveable to position said pucks at a plurality of orientations during irradiation by the radiation source to allow irradiation and detection of the sample at said plurality of orientations.

21. Apparatus in accordance with claim 20 wherein the one or more pucks are substantially cylindrical and wherein the sample holder is rotatable about an axis to rotate said pucks during irradiation by the radiation source to allow irradiation and detection of the sample at a plurality of orientations.

* * * * *